(12) United States Patent
Yasuhara

(10) Patent No.: US 8,422,048 B2
(45) Date of Patent: Apr. 16, 2013

(54) IMAGE FORMING APPARATUS AND METHOD

(75) Inventor: Hiroshi Yasuhara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 12/714,145

(22) Filed: Feb. 26, 2010

(65) Prior Publication Data
US 2010/0225950 A1 Sep. 9, 2010

(30) Foreign Application Priority Data
Mar. 5, 2009 (JP) ................................. 2009-052558

(51) Int. Cl.
*G06K 15/00* (2006.01)
*H04N 1/00* (2006.01)

(52) U.S. Cl.
USPC .......................... 358/1.14; 358/1.16; 358/405

(58) Field of Classification Search .................. 358/1.14, 358/1.15, 471, 400, 1.18, 1.16, 405, 406
See application file for complete search history.

(56) References Cited

U.S. PATENT DOCUMENTS

| | | | | |
|---|---|---|---|---|
| 7,454,796 B2 * | 11/2008 | Mazzagatte et al. | ............ | 726/28 |
| 7,969,599 B2 * | 6/2011 | Hamada | ....................... | 358/1.15 |
| 8,189,217 B2 * | 5/2012 | Ohba | ........................... | 358/1.14 |
| 2003/0093670 A1 * | 5/2003 | Matsubayashi et al. | ....... | 713/168 |
| 2007/0081186 A1 | 4/2007 | Numata | | |
| 2007/0133044 A1 * | 6/2007 | Tanaka | ......................... | 358/1.15 |
| 2008/0151286 A1 * | 6/2008 | Matsuo | ........................ | 358/1.15 |
| 2009/0147306 A1 * | 6/2009 | Sugiyama | .................... | 358/1.15 |
| 2010/0079805 A1 * | 4/2010 | Hashimoto | .................. | 358/1.15 |
| 2010/0195135 A1 * | 8/2010 | Ohba | ........................... | 358/1.14 |

FOREIGN PATENT DOCUMENTS
JP 2007105937 A 4/2007

* cited by examiner

*Primary Examiner* — Jerome Grant, II

(74) *Attorney, Agent, or Firm* — Fitzpatrick, Cella, Harper & Scinto

(57) ABSTRACT

An image forming apparatus associates a plurality of pieces of user information with a single user identifier, and furthermore, stores keys corresponding to keys that are used for signing in association with the respective pieces of user information. Furthermore, when a user uses the image forming apparatus, jobs for which user information attached to the jobs matches user information that is identified when the user uses the image forming apparatus are extracted, signature verification is performed on respective pieces of signature data attached to the extracted jobs, using the keys held in a user information table, and jobs that are successfully verified are further extracted and listed.

8 Claims, 10 Drawing Sheets

F I G. 1
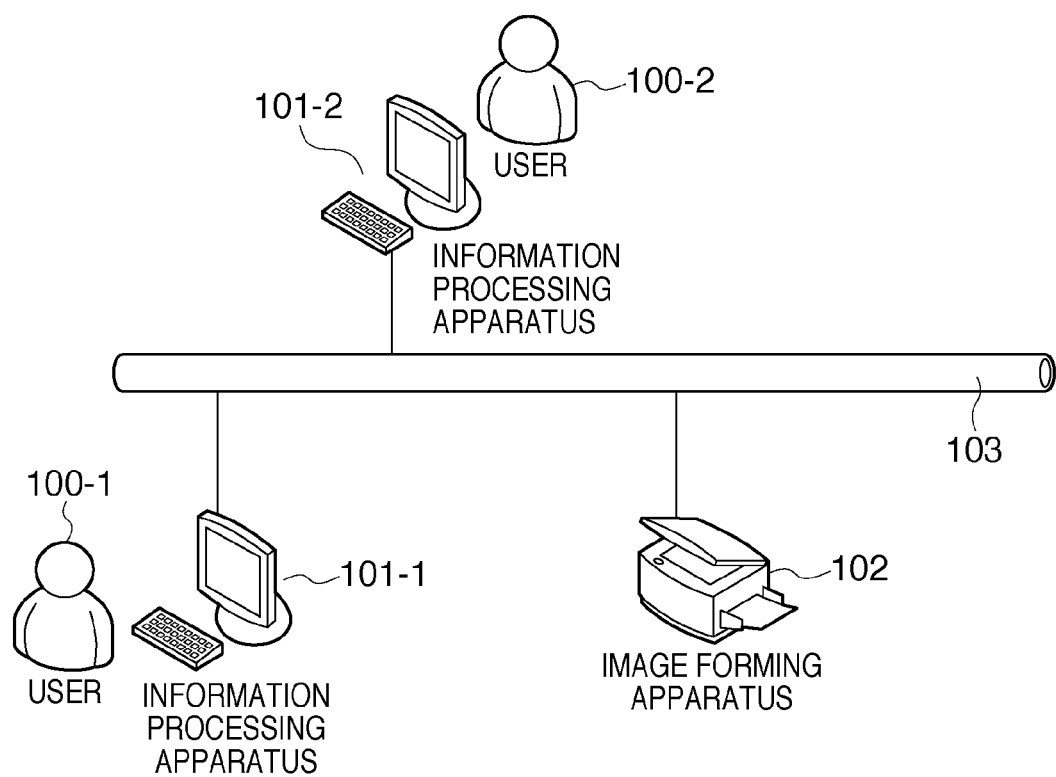

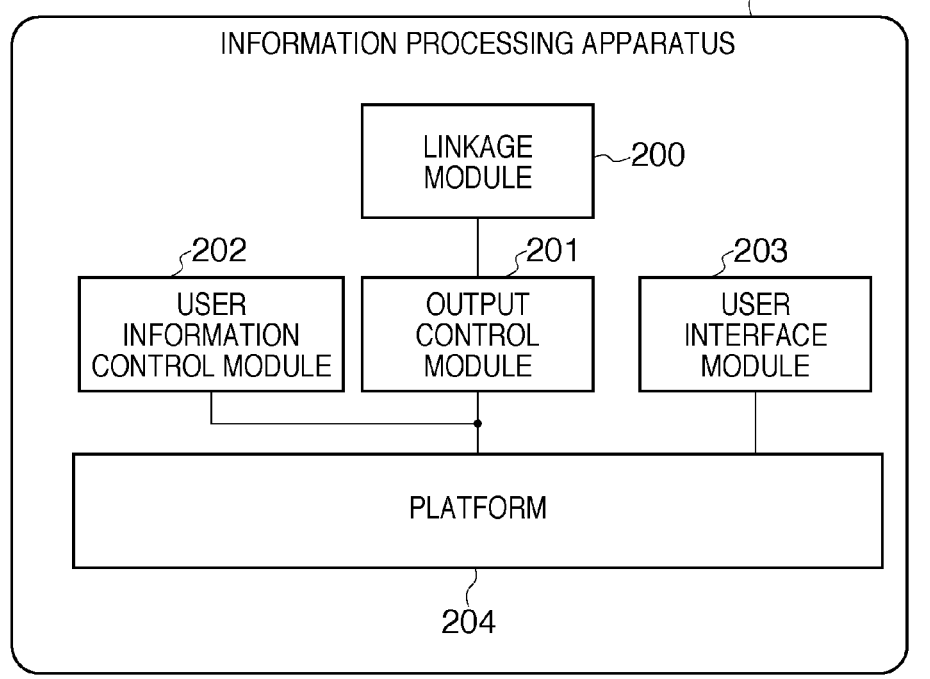
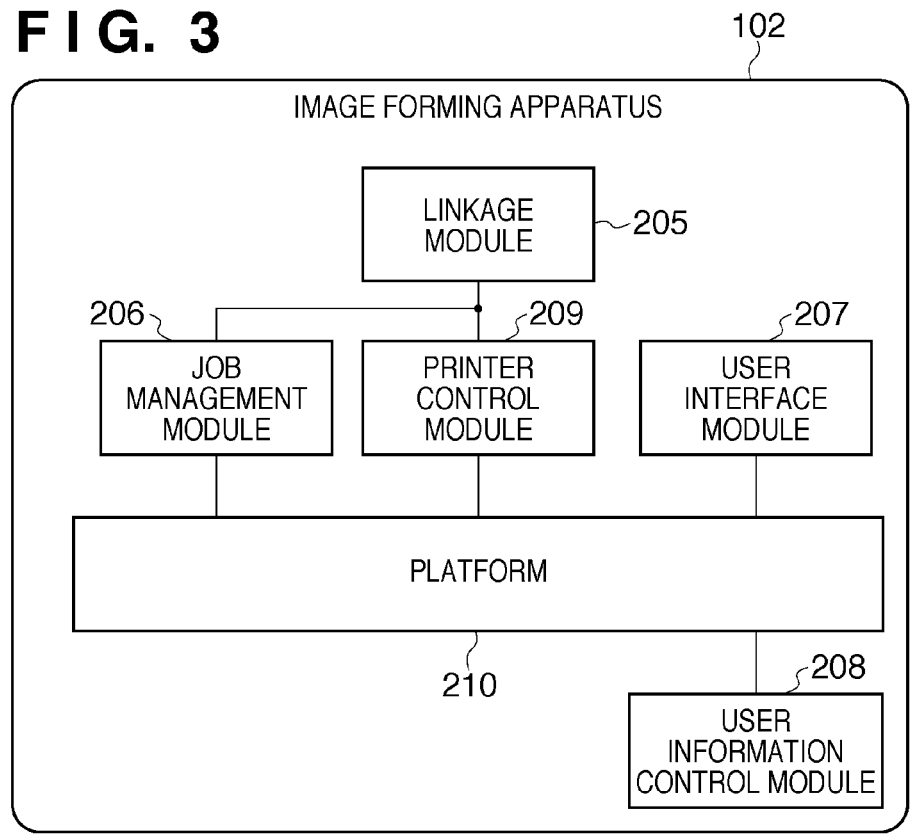

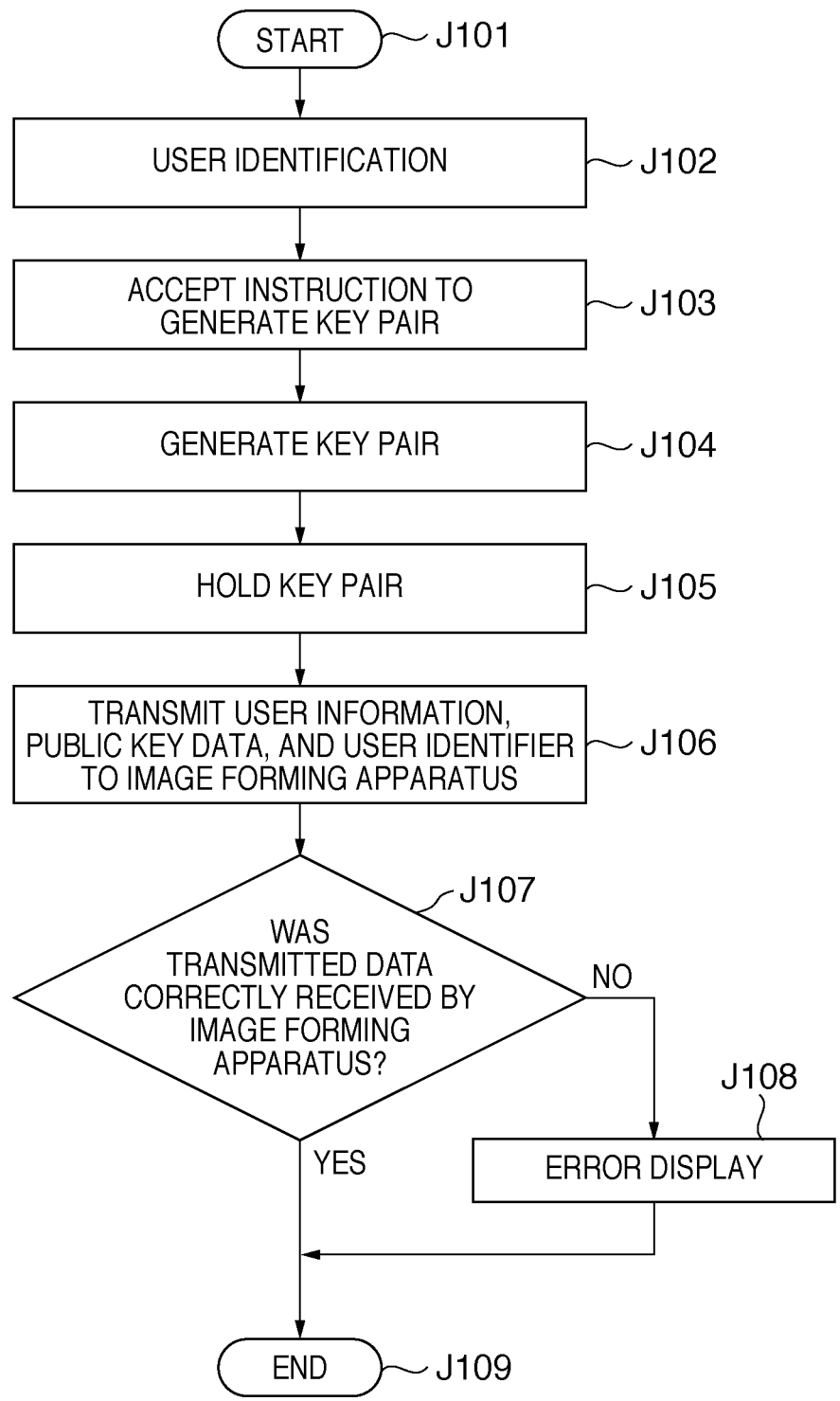

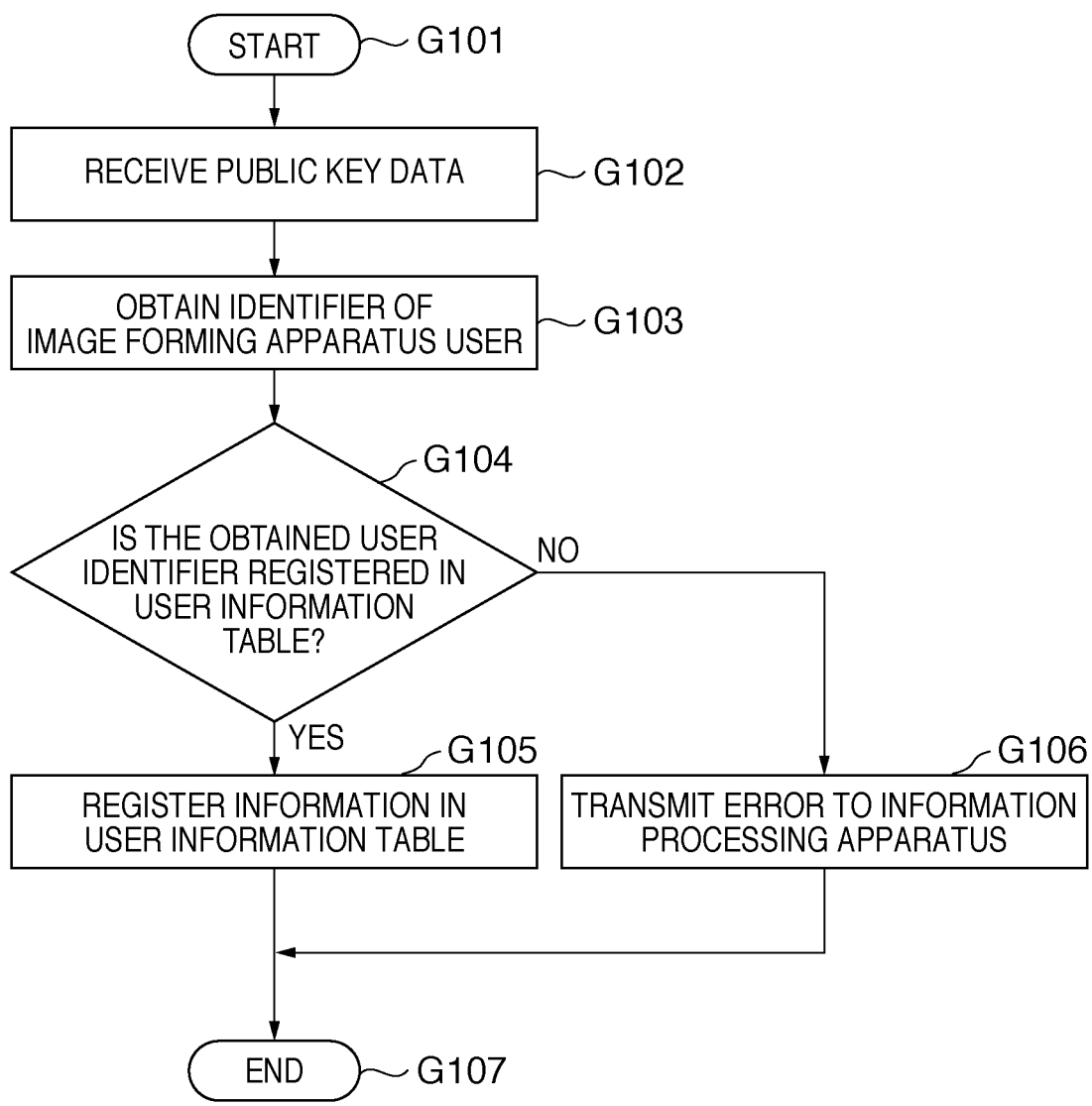

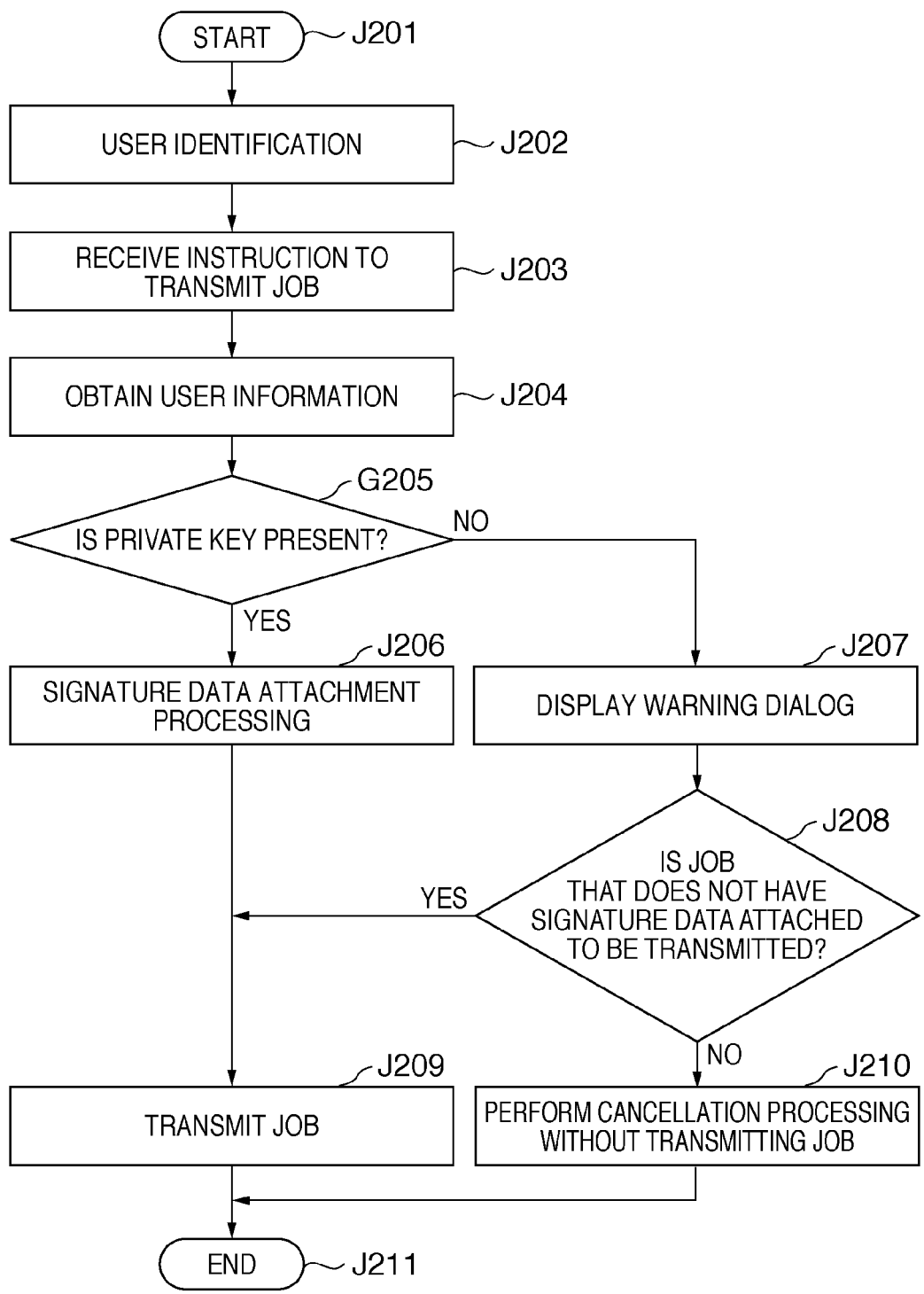

FIG. 12

| MasterUid | Password | SubUser1 | SubUser1Key | SubUser2 | SubUser2Key | SubUser3 | SubUser3Key | OtherInfomation |
|---|---|---|---|---|---|---|---|---|
| User1 | 1 | UserA | Key1 | UserA1 | KeyA1 | | | Mail=User1@Domain.jp |
| User2 | 2 | UserB | Key2 | UserB1 | | | | |
| User3 | 3 | UserC | Key3 | UserC1 | KeyC1 | UserC2 | KeyC2 | |
| User4 | 4 | | | | | | | |
| | | | | | | | | |
| | | | | | | | | |

T01 T02 T03 T04 T05 T06 T07 T08 T09

IMAGE FORMING APPARATUS AND METHOD

BACKGROUND OF THE INVENTION

1. Field of the Invention

The present invention relates to an information processing apparatus and an image forming apparatus for storing jobs transmitted from an external information processing apparatus, and displaying or outputting jobs after filtering job data in accordance with user information.

2. Description of the Related Art

Conventionally, a job output system in an environment in which an image forming apparatus typified by an MFP (multi-function peripheral) or an LBP (laser beam printer) and an information processing apparatus typified by a PC (personal computer) are connected via a network has been proposed (for example, see Japanese Patent Laid-Open No. 2007-105937). In such a job output system, the user enters a job, such as printing, into the image forming apparatus from the PC, and the image forming apparatus stores the entered job and holds job data.

Next, after the user has input user information from an operation panel of the image forming apparatus, the job related to the user stored in the image forming apparatus is displayed, and that job is output from the image forming apparatus by instructing output. In another form, the job related to the user stored in the image forming apparatus is automatically processed, after the user has input user information.

In the job output system proposed in Japanese Patent Laid-Open No. 2007-105937, a job stored within the image forming apparatus is displayed or output in accordance with user information. Thus, this job output system has the advantage of preventing output by other users and the advantage of being able to reduce the time and effort required for the user to select a job related to himself or herself out of a large number of jobs. Moreover, in the case where saved data is printed, an effect of preventing a printed document from being stolen can also be expected, given that the user will be in the vicinity of the image forming apparatus that performs output.

In the above-described job output system, user information is attached to a job by the information processing apparatus that enters the job, and in the case where user information input to the image forming apparatus matches the user information attached to the job, the image forming apparatus treats that job as a job of the user. However, although the user is the same, the user information handled in the image forming apparatus and the user information handled in the information processing apparatus are not necessarily the same. That is to say, there are cases where the same person uses different pieces of user information between the image forming apparatus and the information processing apparatus. Moreover, there are cases where a plurality of different pieces of user information are held, regardless of whether the user is conscious of it or not, with different pieces of user information being used in the environment in which the job is entered and the environment in which the job is displayed.

In such cases, despite the fact that it was actually the same user that entered the job and input the user information to the image forming apparatus, the user information will be mismatched, since the user information attached to the job will be different from the user information input to the image forming apparatus. Thus, the problem that a desired job associated with that user is not displayed or output on the image forming apparatus may occur.

Moreover, in the case where the image forming apparatus and the information processing apparatus employ different authentication methods or authentication forms, there is a problem in that it cannot necessarily be guaranteed that a user having the same attribute managed in the information processing apparatus and the image forming apparatus can be authenticated as the same user.

Furthermore, even though the users are different, if the user information attached to the job matches the user information input to the image forming apparatus, that job may be treated as a job of the same user on the image forming apparatus. In such a case, if the job contains confidential information, there is a possibility that the confidential information may be leaked.

SUMMARY OF THE INVENTION

The present invention further improves user convenience while solving the above-described problems.

According to one aspect of the present invention, an image forming apparatus that is connected to an information processing apparatus and processes a job received from the information processing apparatus is provided. The image forming apparatus includes an authentication unit configured to authenticate a user, a holding unit configured to hold a plurality of pieces of user information and key information corresponding to the respective pieces of user information in association with a user identifier that is necessary for the user authentication, a determination unit configured to determine a job for which user information associated with the job matches the user identifier held by the holding unit, a verification unit configured to verify signature data attached to the job determined by the determination unit, based on the user information and the key information, and an addition unit configured to add the job to a job list when the verification of the signature data attached to the job by the verification unit has succeeded.

Further features of the present invention will become apparent from the following description of exemplary embodiments with reference to the attached drawings.

BRIEF DESCRIPTION OF THE DRAWINGS

FIG. 1 is a diagram of an example of a system configuration to which an embodiment is applicable.

FIG. 2 is a diagram of an example of a software configuration of an information processing apparatus to which the embodiment is applicable.

FIG. 3 is a diagram of an example of a software configuration of an image forming apparatus to which the embodiment is applicable.

FIG. 4 is a flowchart of public key transmission according to the embodiment.

FIG. 5 is a flowchart of public key registration according to the embodiment.

FIG. 6 is a flowchart of job transmission according to the embodiment.

FIG. 12 is an example of the configuration of a user information table according to the embodiment.

DESCRIPTION OF THE EMBODIMENTS

Figure 7:
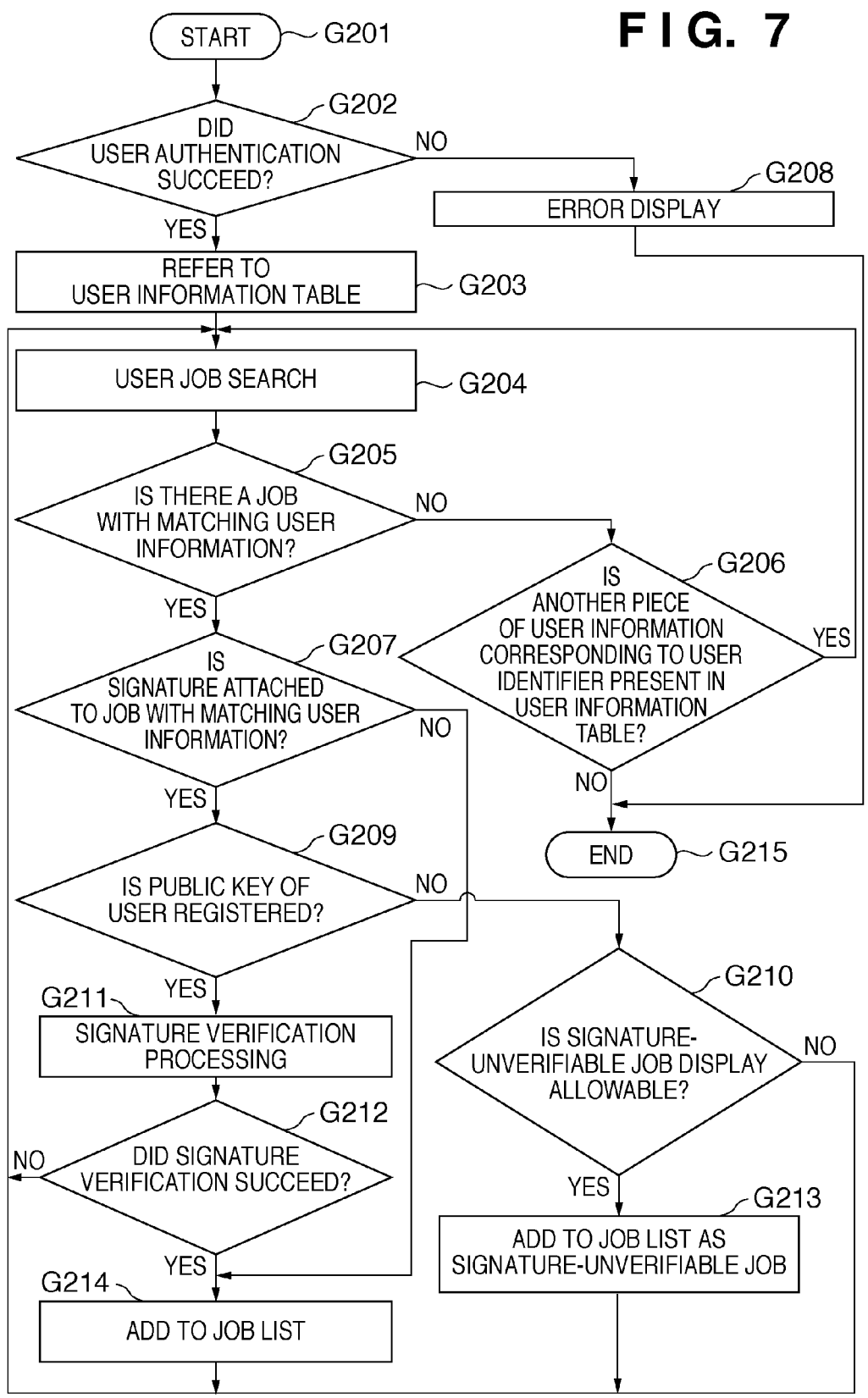
FIG. 7 is a flowchart of job filtering according to the embodiment.

FIG. 1 is a system configuration diagram showing an example of the overall configuration of a job processing system to which the present invention is applicable. The job processing system according to an embodiment of the present invention is configured by information processing apparatuses 101-1 and 101-2 and an image forming apparatus 102, which are connected to one another via a network 103. The information processing apparatuses 101-1 and 101-2 can enter a job containing document data and print data into the image forming apparatus 102. The physically connection between the devices of the present embodiment may be either wireless or wired. Similarly, although it is assumed that the information processing apparatuses 101-1 and 101-2 are personal computers (hereinafter referred to as PCs) or the like, any apparatus can be used as long as that apparatus is capable of transmitting jobs. Likewise, the image forming apparatus 102 can be any apparatus having a function capable of processing jobs transmitted from an information processing apparatus, and is not limited to an MFP or an LBP.

The basic operation flow of the present system is broadly divided into the two operations of entering a job and processing the entered job. The flow of the job entry is as follows. A user 100-1 operates the information processing apparatus 101-1 to enter a job into the image forming apparatus 102 via the network 103. The image forming apparatus 102 holds the job entered from the information processing apparatus 101-1 together with user information. The flow of processing the entered job is as follows.

In order to use the image forming apparatus 102, the user 100-1 performs user authentication via an authentication function of the image forming apparatus 102. The image forming apparatus 102 filters jobs that are being held, based on authenticated user information. A job that has been filtered and identified as being associated with the user is displayed via a user interface or processed as a result of a user instruction, and output. However, the processing after the filtering of jobs is not limited to display or job processing, and it goes without saying that processing is applicable as appropriate.

Example Software Configuration of Information Processing Apparatus

FIG. 2 shows an example of a software configuration provided within the information processing apparatuses in the system configuration to which the present invention is applicable. The information processing apparatuses 101-1 and 101-2 have, as constituent elements, a linkage module 200 for communicating information with an external device, an output control module 201 that controls document output, a user information control module 202 for controlling user information, a user interface module 203 for receiving output instructions and the like from a user, and a platform 204 for the modules to run on.

Example Software Configuration of Image Forming Apparatus

FIG. 3 shows an example of a software configuration provided within the image forming apparatus in the system configuration to which the present invention is applicable. The image forming apparatus 102 has a linkage module 205 for communicating information with an external device and a job management module 206 for holding jobs transmitted from the information processing apparatus 101-1 or 101-2. Furthermore, the image forming apparatus 102 has, as constituent elements, a user interface module 207 for receiving input of authentication information and instructions to display and output jobs from the user, a user information control module 208 that performs user authentication based on the authentication information input by the user and that manages user information, a printer control module 209 that performs control to output jobs based on output instructions accepted from the user, and a platform 210 for the modules to run on.

Flowchart of Public Key Transmission Process

FIG. 4 is a flowchart of a public key transmission process according to the present embodiment. This flowchart shows the flow of a process performed by the information processing apparatus 101-1 or 101-2 in the system configuration shown in FIG. 1 from generation of a pair of a public key and a private key, which is key information for use during user authentication, up to transmission of the public key to the image forming apparatus 102.

J101 is a step of starting the present process, and the process subsequently proceeds to J102. J102 is a user identification step, in which the user information control module 202 receives information for identifying the user (hereinafter referred to as user information) from the user via the user interface module 203 of the information processing apparatus and performs user identification based on that user information. J103 is a key pair generation instruction accepting step, in which the user information control module 202 receives an instruction to generate a key pair from the user via the user interface module 203. J104 is a key pair generating step, in which the user information control module 202 generates a key pair of a private key and a public key corresponding to that private key. Here, any public key encryption scheme may be used. J105 is a key pair holding step, in which the user information control module 202 holds the private key and the public key generated in the key pair generating step J104 in association with the user information. After the completion of the processing, the process proceeds to a public key transmitting step of J106.

J106 is the public key transmitting step, in which the public key is transmitted to the image forming apparatus 102 via the linkage module 200. In this step, information that is necessary in order to use the image forming apparatus 102 is received from the user via the user interface. Here, it is assumed that the information that is necessary in order to use the image forming apparatus is an identifier associated with the user (hereinafter referred to as a user identifier). Thereafter, that user identifier for the image forming apparatus, the public key, and the user information identified in J102 are collectively transmitted to the image forming apparatus 102. J107 is a transmission result receiving step, in which the output control module 201 determines whether or not the various types of data transmitted to the image forming apparatus 102 via the linkage module 200 has been registered normally. If registration has succeeded, the process proceeds to an end step of J109, and if registration has failed, the process proceeds to an error display step of J108. J108 is the error display step, in which notification that transmission and registration of data with respect to the image forming apparatus 102 has failed is given to the user via the user interface module 203. J109 is the end step, in which the present flow is ended.

Flowchart of Public Key Registration Process

FIG. 5 is a flowchart of public key registration according to the present embodiment. This flowchart shows the flow of a process in which the image forming apparatus 102 registers a public key transmitted from the information processing apparatus 101-1 or 101-2 in a user information table T together with user information, in the system configuration shown in FIG. 1. In the present embodiment, user information is held in the form of a user information table. The user information table will be described later with reference to FIG. 12.

G101 is a starting step, and the process subsequently proceeds to G102. G102 is a public key data receiving step, in which the user information control module 208 receives public key data from the information processing apparatus 101-1 or 101-2 via the linkage module 205. G103 is an image forming apparatus user identifier obtaining step, in which the user identifier of the image forming apparatus user and the user information of the information processing apparatus, which are received together with the public key data, are obtained and held. G104 is an image forming apparatus user identifier determination step, in which it is determined whether the user identifier obtained in G103 is registered in a Master Uid record of the user information table T. If the user identifier is registered, the process proceeds to a user information registering step of G105, and if the user identifier is not registered, the process proceeds to an error transmitting step of G106. G105 is the user information registering step, in which the public key data and the user information of the information processing apparatus are registered in the user information table T. In the registration process, the user information and the public key data are stored in Sub User and Sub User Key fields, respectively, in association with the identifier of the image forming apparatus user obtained in G103 registered in the Master Uid record. If the registration is completed, the process proceeds to an end step of G107. G106 is the error transmitting step, in which the user information control module 208 transmits a registration error to the source of the data, that is, the information processing apparatus 101-1 or 101-2, via the linkage module 205. G107 is the end step, in which the present flow is ended.

Flowchart of Job Transmission Process

FIG. 6 is a flowchart of job transmission according to the present embodiment. This flowchart shows the flow of a process up to transmission of a job to the image forming apparatus 102 by the information processing apparatus 101-1 or 101-2 in the system configuration shown in FIGS. 1, 2, and 3 described above. J201 is a starting step, and the process subsequently proceeds to J202. J202 is a user identification step, in which user information is received from the user via the user interface module 203 of the information processing apparatus, and user identification is performed. J203 is a job transmission instruction receiving step, in which an instruction to transmit a job is received from the user via the user interface module 203. J204 is a user information obtaining step, in which information related to the user identified in J202 is obtained from information that is held. Specifically, the user information identified in J202 and a private key associated with that user information are obtained from the information that is held, and transmitted to the output control module 201. After the completion of obtaining user information, the process proceeds to a private key determination step of J205. J205 is the private key determination step, in which it is determined whether or not a private key associated with the user information is present in the information processing apparatus. If a private key is present, the process proceeds to a signing step of J206, and if a private key is absent, the process proceeds to a warning dialog display step of J207. J206 is a signature data attachment processing step, in which processing for attaching signature data to the job is performed using the private key associated with the user that has been determined in J205. Specifically, hash data is generated based on job data. Encryption is performed on the generated hash data using the private key, and the encrypted hash value is attached to the job data. After the completion of attaching signature data, the process proceeds to a job transmitting step of J209.

J207 is the warning dialog display step, in which notification that the signature data attachment processing will not be performed because of the absence of a private key is given to the user via the user interface module 203. The process proceeds to a job transmission determination step of J208. J208 is the job transmission determination step, in which an instruction as to whether or not to transmit the job that does not have signature data attached to the image forming apparatus 102 is received from the user via the user interface module 203. Furthermore, if an instruction to transmit the job that does not have signature data attached is received, the process proceeds to the job transmitting step of J209, and if an instruction to not transmit the job is received, the process proceeds to a job cancellation step of J210. J209 is the job transmitting step, in which the job is transmitted to the image forming apparatus 102 via the linkage module 200. After the transmission, the process proceeds to J211 and is ended. J210 is the job cancellation step, in which processing for cancelling the job transmission is performed. After the end of the cancellation processing, the process is ended in J211. J211 is an end step, in which the series of steps of the job transmission flow is ended.

Flowchart of Job Filtering Process

FIG. 7 is a flowchart of job filtering according to the present embodiment. This flowchart shows the flow of a job filtering process performed by the image forming apparatus 102 in the system configuration shown in FIG. 1 described above. G201 is a starting step, and the process subsequently proceeds to a user authentication step of G202. G202 is the user authentication step, in which input of user authentication information from the user is accepted via the user interface module 207 of the image forming apparatus 102. Thereafter, authentication processing is performed in the user information control module 208. In the authentication processing, a comparison is performed to determine whether the accepted user identifier and password are the same as a user identifier and password registered in the user information table. If the same, the process proceeds to a user information table referring step of G203. Although details will be described with reference to FIG. 12, here, out of sets of information in the Master Uid column T01 and the Password column T02 of the table T, a relevant set is searched for and compared with the accepted identifier and password. If the comparison of the user identifiers and the passwords is unsuccessful, user authentication fails, and the process proceeds to an error display step of G208. G203 is the user information table referring step, in which corresponding information is obtained from the user information table, based on the information authenticated in G202, employing the Master Uid that matches the identifier of the image forming apparatus user as a key. Specifically, in the case where the Master Uid is User 1, corresponding information, such as User A, is obtained. Thereafter, the process proceeds to a user job search step of G204.

G204 is the user job search step. In the user job search step, user identifiers (here, the Master Uid and each Sub User) are compared with the user information contained in each job stored in the job management module 206 to extract a matched job. In G205, it is determined whether or not a matched job is present based on the result of G204. If a matched job is present, the process proceeds to a signature checking step of G207. If a matched job is absent, the process proceeds to a user switching step of G206. Moreover, when checking of all the jobs has been completed, the process proceeds to G206. G206 is the user switching step, in which the user information to be searched for in G204 is switched to another piece of user information for which the processing for searching for a job associated therewith has not yet been performed. The other piece of user information here has been obtained in G203. For example, in this step, in the case where, in the user job search of G204, the jobs of the user whose Master Uid is User 1 were searched to find a job whose user information indicates User A, the user information is switched to User A1, which is another piece of user information associated with the identifier of the user whose Master Uid is User 1. Subsequently, a job of User A1 is searched for in the user job search of G204. This processing is repeated in the same manner, and eventually, when switching has been performed with respect to all the pieces of user information registered in the user information table under Sub User, the process proceeds to an end step of G215. By repeating this switching processing, jobs can be treated as jobs of the same user, even though the user information is different.

G207 is the job signature attachment checking step, in which it is determined whether or not signature data is attached to the job whose user information matches the user identifier. If signature data is attached to the job, the process proceeds to a public key checking step of G209, and if signature data is not attached, the process proceeds to a job list addition step of G214. G208 is the error display step, in which notification that user authentication has failed is displayed via the user interface module 207, and thereafter the process proceeds to the end step of G215. G209 is the public key checking step, in which it is determined whether or not a public key associated with the Sub User corresponding to the Master Uid of the user authenticated in G202 is registered. If a public key is registered, the process proceeds to a signature verification step of G211, and if a public key is not registered, the process proceeds to a display determination step of G210. G210 is the display determination step. In this step, it is determined whether or not to display a signature-unverifiable job whose signature data cannot be verified. A setting serving as a judgment criterion is held in the job management module 206 beforehand, and the processing is performed based on that setting. If it is determined that the job is to be displayed, the process proceeds to a signature-unverifiable job list addition step of G213. If it is determined that the job is not to be displayed, the process proceeds to the user job search step of G204, and the search processing for determining whether or not there is any other user job is repeated.

G211 is the signature verification step. Signature verification processing is performed using the signature data attached to the job and the public key checked in the public key checking step G209 based on the user information. In the signature verification processing, hash data is generated based on the job data. Furthermore, the signature data attached to the job is decoded using the public key, and it is determined whether or not the generated hash data matches the decoded signature data. In G212, if the compared data items match, it is determined that signature verification has succeeded, and the process proceeds to the job list addition step of G214. If the compared data items do not match, it is determined that signature verification processing has failed, and the process proceeds to the user job search step G204 again, in which the processing for determining whether or not there is any other user job is repeated. G213 is the signature-unverifiable job list addition step, in which the job for which it has been determined not to perform display in the display determination step G210 is added to a signature-unverifiable job list. After the addition, the process proceeds to the user job search step G204, and the processing for determining whether or not there is any other user job is repeated. G214 is the job list addition step, in which the job for which it has been determined to add to the job list in G207 and G212 is added to the job list, and the process proceeds to the user job search step G204, in which the processing for determining whether or not there is any other user job is repeated. G215 is the end step, in which the present flow is ended.

Flowchart of Job List Display and Job Processing Acceptance Process

Figure 8:
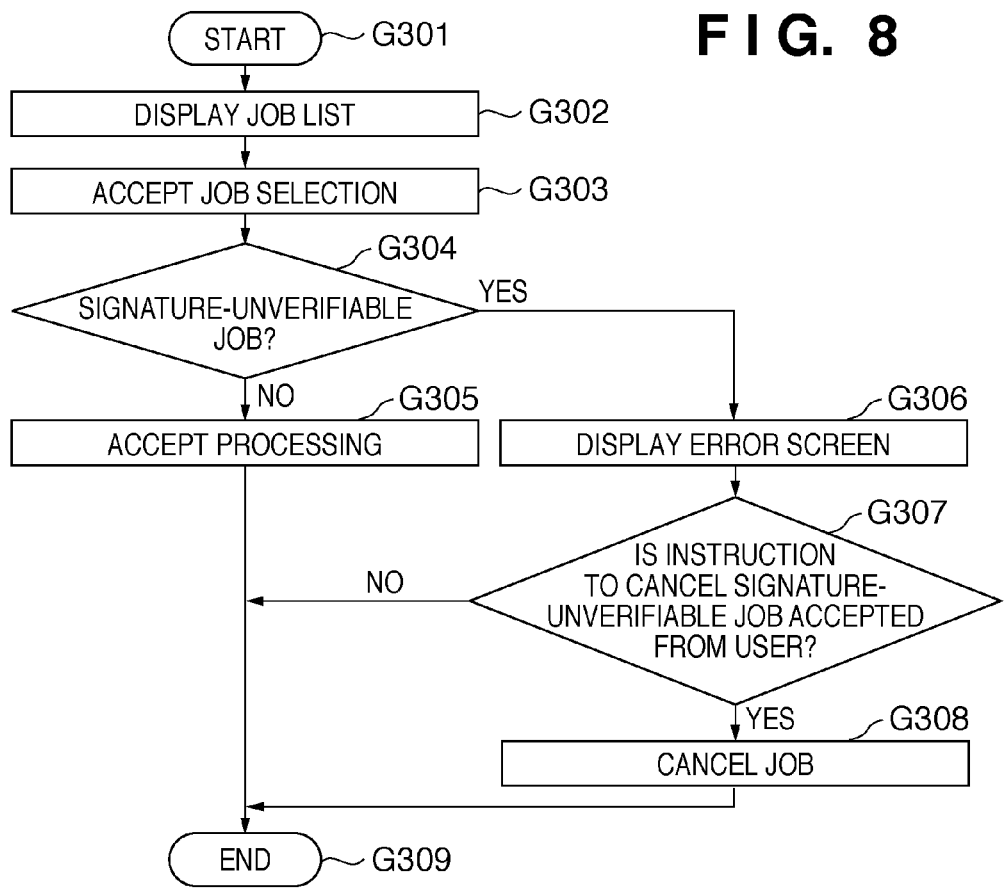
FIG. 8 is a flowchart of job list display and job processing acceptance according to the embodiment.

FIG. 8 is a flowchart of job list display and job processing acceptance according to the present embodiment. This flowchart shows a flow in which the image forming apparatus 102 performs a job list display and job processing acceptance process from display of a job list up to acceptance of job processing, in the system configuration shown in FIG. 1 described above. G301 is a starting step, and the present flow is started after user authentication and job list generation have been performed based on the flow shown in FIG. 7. G302 is a job list displaying step, in which the user interface module 207 displays the signature-unverifiable job list and the job list that have already been generated on the user interface module 207. When performing list display, jobs in the signature-unverifiable job list may be displayed in a state of being distinguishable from other jobs by, for example, graying out those jobs so as to be identifiable by the user. In contrast, with respect to the job list, display may be performed without such processing as graying out. Here, the user needs only be made aware of the difference between the jobs displayed in the lists, and the method of list display is not limited to the above-described method. After the display is performed, the process proceeds to a job selection accepting step of G303. G303 is the job selection accepting step. Processing of a job is started by the user selecting the job in the displayed job lists on the user interface module 207. After the selection of the job by the user is accepted, the process proceeds to a signature-unverifiable job determination step of G304. G304 is the signature-unverifiable job determination step. If a job is selected by the user that has been added to the job list as a signature-unverifiable job in G213, the process proceeds to an error screen display step of G306. If the selected job is not a signature-unverifiable job, the process proceeds to a processing accepting step of G305. G305 is the processing accepting step. In this step, a job operation instruction is accepted from the user, and subsequent processing is performed according to that instruction. Any type of processing can be performed on the job here, and the type of processing depends on the functions of the image forming apparatus to which the present invention is applied. Examples of such processing include outputting of printed matter, cancellation, and the like, but detailed descriptions thereof are omitted here. After the acceptance of processing is received, the process is ended in an end step of G309.

G306 is the error screen display step. In this step, the user is notified that the job that he or she selected in G303 is a signature-unverifiable job, and the fact that processing that can be accepted with respect to the selected job is limited is displayed. That is to say, a message that execution of processing such as outputting is not allowed because the job is a signature-unverifiable job and it thus cannot be determined whether or not it was the user who is logged in who transmitted the job is displayed. However, the case where signature verification cannot be performed because the user has not registered a public key, despite the job belonging to the user who is logged in, is conceivable. In such a case, the job ceases to be a signature-unverifiable job, and operations that were restricted become executable, as a result of the user registering the public key and causing job list display to be performed again, that is, causing the image forming apparatus to perform authentication. For this reason, an error screen is displayed in order to indicate to the user that the public key has not yet been registered. Moreover, in this step, the user is able to cancel the job, at the same time as the error screen is displayed. With respect to job cancellation, unlike output processing, the user may be permitted to cancel a job belonging to another person. In the present embodiment, job cancellation is allowed in this step, even in the case of a signature-unverifiable job with respect to which it cannot be checked whether the job belongs to the user or not. After the error screen is displayed, the process proceeds to a cancellation acceptance determination step of G307. G307 is the cancellation acceptance determination step. After the error screen is displayed in G306, an instruction as to whether or not to cancel an arbitrary signature-unverifiable job is received from the user via the user interface module 207. If a job cancellation instruction is accepted, the process proceeds to the job cancellation step of G308. If cancellation is not to be performed, the process is ended in G309. G308 is the job cancellation step, in which job cancellation processing is executed, and the process proceeds to the end step of G309. G309 is the end step, in which the present flow is ended.

Flowchart of Job Execution

Figure 9:
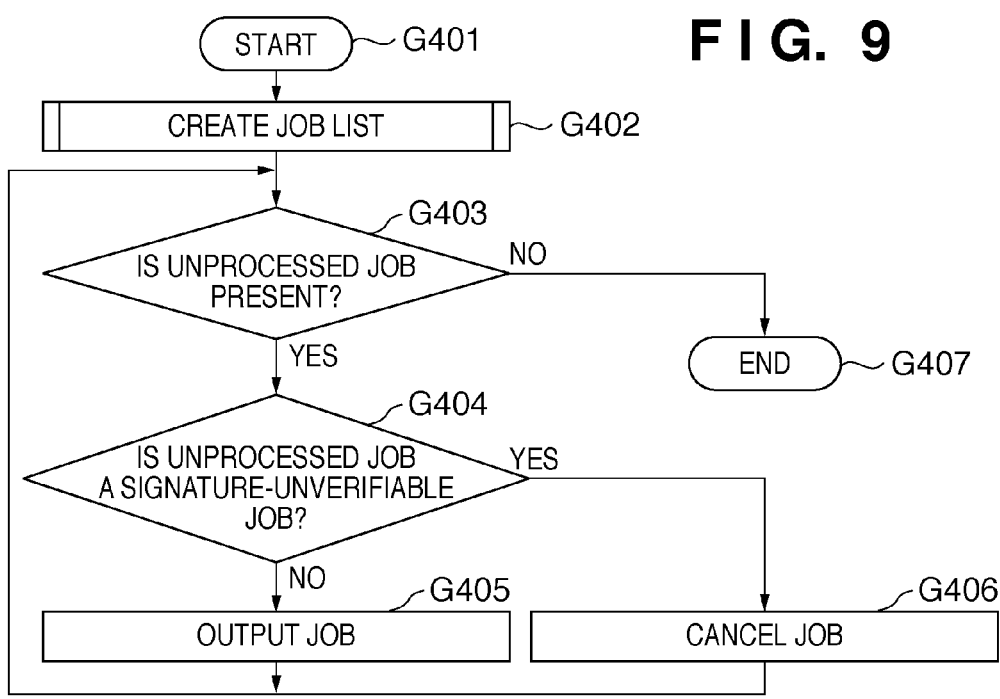
FIG. 9 is a flowchart of job execution according to the embodiment.

FIG. 9 is a job execution flowchart according to the present embodiment. This flowchart shows the flow of a process in which the image forming apparatus 102 processes an arbitrary job in the system configuration shown in FIG. 1 described above, as a different embodiment from the flow of the job list display and job processing acceptance process shown in FIG. 8. Job execution here is performed based on the job lists generated in FIG. 7. G401 is a starting step, and the present step is started as a result of the job list creation flow in FIG. 7 ending. G402 is a job list creating step, in which a list of jobs to be processed is created, and the process proceeds to an unprocessed job determination step of G403. Here, job list creation denotes the job lists generated in the flowchart shown in FIG. 7. G403 is the unprocessed job determination step, in which it is determined whether or not an unprocessed job is present on the generated job lists. If an unprocessed job is present, the process proceeds to a signature-unverifiable job determination step of G404, and if an unprocessed job is not present, the process proceeds to an end step of G407. G404 is the signature-unverifiable job determination step, in which it is determined whether or not the job to be output is a signature-unverifiable job. If the job to be output is a signature-unverifiable job, the process proceeds to a job cancellation step of G406. If the job to be output is not a signature-unverifiable job, the process proceeds to a job outputting step of G405. G405 is a job processing step, in which processing of the job is executed and the job lists are updated by changing the executed job to a processed job. As described above, with respect to the details of the processing of the job executed in this step, any type of processing may be executed, and the type of processing depends on the functions of the image forming apparatus. When the processing is completed, the process proceeds to the unprocessed job determination step G403, and the processing is repeated on an unprocessed job in the job lists. G406 is the job cancellation step, in which cancellation of the signature-unverifiable job is executed, and the job lists are updated by changing the cancelled job to a processed job. Thereafter, the process proceeds to the unprocessed job determination step G403, and the processing is repeated on an unprocessed job in the job lists. G407 is the end step, in which the present flow is ended.

Flowchart of Cancellation Process

Figure 10:
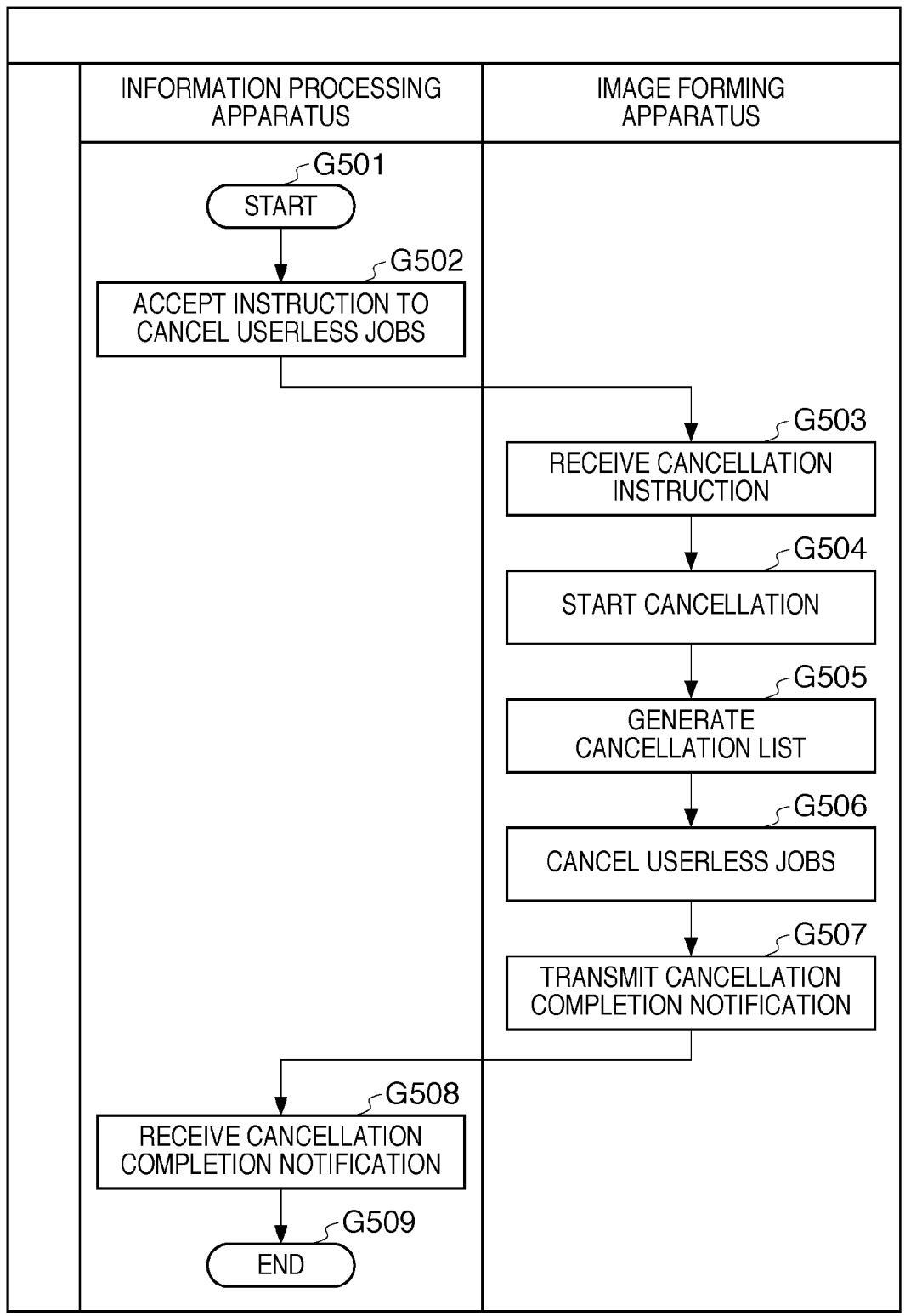
FIG. 10 is a flowchart of when manual cancellation is performed by a user according to the embodiment.
Figure 11:
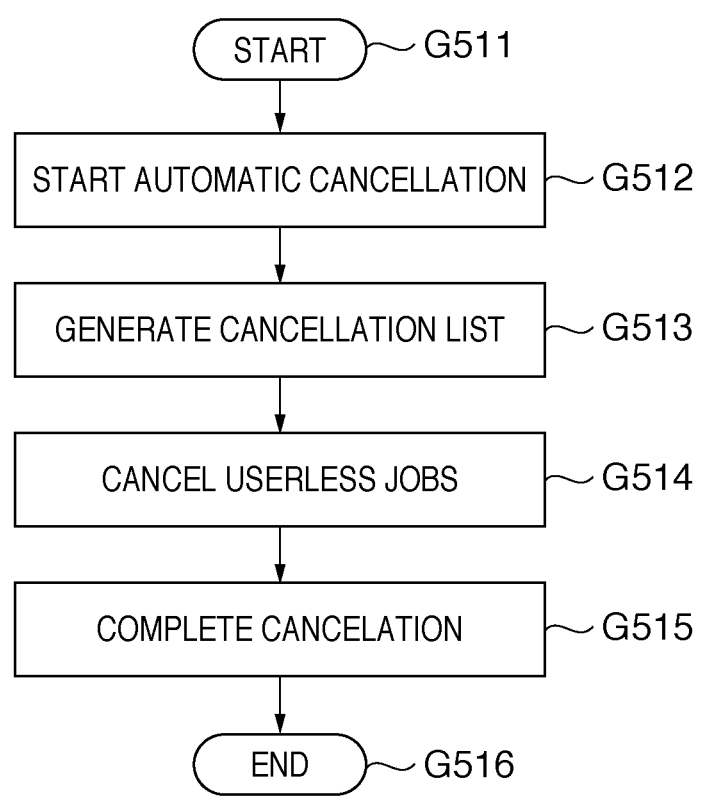
FIG. 11 is a flowchart of automatic cancellation according to the embodiment.

FIGS. 10 and 11 show the flow of the cancellation process of a job that is not associated with user information (hereinafter referred to as a userless job) according to the present embodiment. In the present embodiment, jobs are filtered based on user information attached to the jobs and user identifiers managed in a user information management table of the image forming apparatus. With such a method, if the user information attached to a job is not present in the user information management table of the image forming apparatus, that job is not filtered and consequently remains in the job management module of the image forming apparatus. If jobs (userless jobs) that are not referred to or executed by any user accumulate in the job management module in this manner, there is a risk that the accumulated jobs may put pressure on the storage area of the image forming apparatus. Thus, in the present flow, a process for manually or automatically deleting jobs that are not referred to or executed by any user will be described.

FIG. 10 is a flowchart of manual job cancellation by an administrator according to the present embodiment. This flowchart shows a process regarding cancellation of userless jobs in the information processing apparatuses and the image forming apparatus, in the system configuration shown in FIG. 1 described above. G502 is a userless job cancellation instruction accepting step, in which a job cancellation instruction from the user is accepted in the user interface module 203 of the information processing apparatus 101-1 or 101-2. Then, the userless job cancellation instruction is transmitted to the image forming apparatus 102 via the linkage module 200. G503 is a cancellation instruction receiving step, in which the image forming apparatus 102 receives the userless job cancellation instruction from the information processing apparatus 101-1 or 101-2. The process proceeds to a cancellation starting step of G504. G504 is the cancellation starting step. All the jobs stored in the job management module 206 of the image forming apparatus and the user information of those jobs are obtained. Thereafter, the process proceeds to a cancellation list generating step of G505. G505 is the cancellation list generating step, in which the user information of target jobs whose cancellation has been instructed is compared with the information in the Master Uid column and the Sub User columns in the user information table. Then, jobs whose user information does not match the information in the user information table are searched for. Jobs whose user information does not match the information in the user information table are added to a cancellation list. After the generation of the cancellation list in this step, the process proceeds to a cancellation executing step of G506. G506 is the cancellation executing step, in which cancellation processing is executed with respect to all the jobs added to the cancellation list in G505, and the process proceeds to a cancellation completion notification transmitting step of G507. G507 is the cancellation completion notification transmitting step, in which, as a response to the cancellation instruction transmitted from the information processing apparatus 101-1 or 101-2, notification that the cancellation processing has been completed is transmitted to the source information processing apparatus via the linkage module 205. G508 is a cancellation completion notification receiving step, in which the cancellation completion notification transmitted from the image forming apparatus 102 is received. G509 is an end step, in which the present flow is ended.

FIG. 11 is a flowchart of automatic cancellation according to the present embodiment. This flowchart shows the flow of automatic userless job cancellation in the image forming apparatus 102, in the system configuration shown in FIG. 1 as described above. The present flow is started when a condition preset in the job management module 206 is satisfied. For example, this flow is started at a specific time or in a case where the number of accumulated jobs exceeds a predefined value. However, the settings are not limited to these, and any method of holding and configuring setting can be used.

When the present flow is started in accordance with an arbitrary setting, the process proceeds to an automatic userless job cancellation starting step of G512. G512 is the automatic cancellation starting step, in which all the jobs stored in the job management module 206 and the user information of those jobs are obtained. Thereafter, the process proceeds to a cancellation list generating step of G513. G513 is the cancellation list generating step, in which the user information of the jobs obtained in G512 is compared with the information in the Master Uid column and the Sub User columns in the user information table, and jobs whose user information does not match the information in the user information table are searched for. Jobs whose user information does not match the information in the user information table are added to a cancellation list. After the generation of the cancellation list in this step, the process proceeds to a cancellation executing step of G514. G514 is the cancellation executing step, in which cancellation is executed with respect to all the jobs added to the cancellation list in G513. Thus, accumulated userless jobs are deleted. The process proceeds to a cancellation completion step of G515. G515 is the cancellation completion step, and the process proceeds to an end step of G516. G516 is the end step, in which the present flow is ended.

In the foregoing manner, the resource of the image forming apparatus can be fully utilized without being wasted, by deleting unnecessary jobs that accumulate before the user realizes.

Example Configuration of the User Information Table

FIG. 12 is an example of the user information table managed by the user information control module 208 provided in the image forming apparatus 102 to which the present embodiment is applicable.

T01 indicates the Master Uid column, in which user identifiers for specifying users in order to use the image forming apparatus 102 are stored.

T02 indicates passwords corresponding to the Master Uids, and passwords that are necessary for user authentication processing when the image forming apparatus 102 is used are stored.

T03 indicates user information of Sub User 1, and user information that is associated with but different from the Master Uid is stored. In the present embodiment, this corresponds to the user information of the information processing apparatuses.

T04 indicates Sub User 1 Key, and public key information corresponding to the Sub User 1 is stored. The public key information is generated in the key pair generating step J104 in the information processing apparatuses and stored in a pair with the Sub User 1.

T05 indicates user information of Sub User 2, and like the Sub User 1, user information that is associated with but different from the Master Uid is stored.

T06 indicates Sub User 2 Key, and like the Sub User 1 Key, public key information paired with the Sub User 2 is stored.

T07 indicates user information of Sub User 3, and like the Sub User 1, user information that is associated with but different from the Master Uid is stored.

T08 indicates Sub User 3 Key, and like the Sub User 1 Key, public key information paired with the Sub User 3 is stored.

T09 indicates an Other Information column, in which information related to the Master Uid is stored. For example, e-mail addresses or the like may be stored.

In the present embodiment, an example user information table having three Sub User columns from the Sub User 1 to the Sub User 3 is shown. However, any number of Sub Users and key information paired therewith can be registered, and it is not intended to limit this.

In FIG. 12, with respect to the user whose Master Uid is User 1, Sub User 1 and Sub User 2 are registered as related user information, and respective public keys are stored in association therewith. With respect to the user whose Master Uid is User 2, it is shown that no public key is registered in association with User B1, which is the related user information.

As described above, according to the present invention, it is possible, in an environment in which it was conventionally impossible to recognize jobs as being from the same user, to recognize jobs as being from the same user through filtering the jobs, by treating a plurality of pieces of user information as belonging to the same user. The effect of improving convenience can thereby be obtained.

Moreover, the effect of improving job filtering accuracy and security is obtained by further applying filtering in which signature verification for distinguishing jobs whose user information matches but that substantially belong to different users is performed.

Furthermore, filtering based on signature verification processing when user authentication is performed is further executed after filtering for recognizing the same user. The number of jobs for which redundant verification is performed on the same user is thus suppressed, and as a result, an effect is achieved whereby the influence on the performance of the image forming apparatus can be minimized. According to the present invention, user convenience can be improved by the foregoing effects.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-052558, filed Mar. 5, 2009, which is hereby incorporated by reference herein in its entirety.

What is claimed is:

1. An image forming apparatus that is connected to an information processing apparatus and processes a job received from the information processing apparatus, the image forming apparatus comprising:

an authentication unit configured to authenticate a user;
a holding unit configured to hold a plurality of pieces of user information and key information corresponding to the respective pieces of user information in association with a user identifier that is necessary for the user authentication;

a determination unit configured to determine a job for which user information associated with the job matches the user identifier held by the holding unit;

a verification unit configured to verify signature data attached to the job determined by the determination unit, based on the user information and the key information;

an addition unit configured to add the job to a job list when the verification of the signature data attached to the job by the verification unit has succeeded;

a display unit configured to display the job list added to by the addition unit;

an accepting unit configured to accept an instruction to output a job displayed by the display unit from the user; and an output unit configured to output the job accepted from the information processing apparatus, wherein the display unit displays a job list including a job whose signature is unverifiable in addition to a job whose signature has been verified.

2. The image forming apparatus according to claim 1, further comprising a receiving unit configured to receive user information and key information corresponding to the user information transmitted from the information processing apparatus.

3. The image forming apparatus according to claim 1, wherein the display unit, when displaying a job list related to user information for which corresponding key information is not held, indicates that a job included in the job list is a signature-unverifiable job, and the accepting unit restricts acceptance of an instruction to output the signature-unverifiable job.

4. The image forming apparatus according to claim 1, wherein the accepting unit, if the job with respect to which the output instruction was accepted from the user is a signature-unverifiable job, subsequently accepts a cancellation instruction, and the output unit performs processing of the job based on the instruction from the user accepted by the accepting unit.

5. The image forming apparatus according to claim 1, wherein if the job to be output is a signature-unverifiable job, the accepted job is cancelled.

6. The image forming apparatus according to claim 1, comprising a deletion unit configured to delete a job corresponding to a user whose user information is not held by the holding unit.

7. A non-transitory computer-readable storage medium storing a computer program for causing an image forming apparatus to function as the units of the image forming apparatus according to claim 1.

8. A method for controlling an image forming apparatus that is connected to an information processing apparatus and processes a job received from the information processing apparatus, the method comprising:

an authentication step for authenticating a user;

a holding step for holding a plurality of pieces of user information and key information corresponding to the respective pieces of user information in a memory in association with a user identifier that is necessary for the user authentication;

a determination step of determining a job for which user information associated with the job matches the user identifier held in the memory;

a verification step of verifying signature data attached to the job determined by the determination step, based on the user information and the key information; and an addition step of adding the job to a job list when the verification of the signature data attached to the job in the verification step has succeeded;

a display step of displaying the job list added to by the addition step;

an accepting step of accepting an instruction to output a job displayed by the display step from the user; and an output step of outputting the job accepted from the information processing apparatus, wherein the display step displays a job list including a job whose signature is unverifiable in addition to a job whose signature has been verified.

* * * * *